United States Patent
Williams et al.

(10) Patent No.: US 6,715,007 B1
(45) Date of Patent: Mar. 30, 2004

(54) METHOD OF REGULATING A FLOW OF DATA IN A COMMUNICATION SYSTEM AND APPARATUS THEREFOR

(75) Inventors: Brent Ashley Williams, Chandler, AZ (US); John Abel, Scottsdale, AZ (US); Keith Matthew Nolan, Chandler, AZ (US); Keith Palermo, Higley, AZ (US); Scott Demarest, Gilbert, AZ (US)

(73) Assignee: General Dynamics Decision Systems, Inc., Scottsdale, AZ (US)

(*) Notice: Subject to any disclaimer, the term of this patent is extended or adjusted under 35 U.S.C. 154(b) by 450 days.

(21) Appl. No.: 09/615,303

(22) Filed: Jul. 13, 2000

(51) Int. Cl.[7] .................................................. G06F 3/00
(52) U.S. Cl. ............................ 710/52; 710/29; 710/57; 710/56; 710/53; 370/229; 370/230; 370/231
(58) Field of Search .............................. 710/52–57, 29; 370/229, 330, 331

(56) References Cited

U.S. PATENT DOCUMENTS

| | | | | |
|---|---|---|---|---|
| 3,840,859 A | * | 10/1974 | Vigil et al. ................... 710/29 |
| 5,210,829 A | * | 5/1993 | Bitner .......................... 710/57 |
| 6,138,189 A | * | 10/2000 | Kalkunte ...................... 710/53 |
| 6,170,022 B1 | * | 1/2001 | Linville et al. ............... 710/29 |
| 6,493,336 B1 | * | 12/2002 | Perry et al. .................. 370/352 |

* cited by examiner

Primary Examiner—Jeffrey Gaffin
Assistant Examiner—Mike Nguyen
(74) Attorney, Agent, or Firm—Ingrassia Fisher & Lorenz, P.C.

(57) ABSTRACT

A flow of data (26) is regulated in a communication system (20). A data rate is established in each of a data source (24) and a data sink (28). The data (26) is transmitted by the data source (24) and written into a buffer (32) at the source data rate, then read from the buffer (32) and received by the data sink (28) at the sink data rate. The level (62) of data (26) in the buffer (32) is monitored, and a rate-control signal (74) is dispatched to either the data source (24) or sink (28) when it is determined the buffer data level (62) is decreasing or increasing while at a lower or upper data-level threshold (66, 68), respectively. One of the data rates is adjusted in response to a rate-control signal (74).

21 Claims, 4 Drawing Sheets

116

METHOD OF REGULATING A FLOW OF DATA IN A COMMUNICATION SYSTEM AND APPARATUS THEREFOR

TECHNICAL FIELD OF THE INVENTION

The present invention relates to the field of communication systems. More specifically, the present invention relates to the field of data-flow regulation in communication systems.

BACKGROUND OF THE INVENTION

Certain difficulties are encountered in the transmission and reception of data in a communication system. With synchronous serial data, these difficulties encompass mismatches between data source and data sink clocks, variations in data arrival times within the system, and a low tolerance to overrun and underrun conditions.

Under ideal conditions, serial data is transmitted and received at identical data rates. That is, a data-rate clock in a data source would be identical to a data-rate clock in a data sink, e.g., 9600.0000 baud. To do so, however, would require perfectly matched oscillators in both the data source and sink. This is not practical in a real-world system. Crystal tolerances alone would prohibit such exactitude.

Utilizing high-accuracy oscillators, data source and data sink oscillators can become very close in frequency. Close, however, is not exact, and this inexactitude causes problems, especially with substantially continuous data. For example, it may be seen that continuous-data rates of 9600.0001 baud and 9599.9999 baud for the source and sink, respectively, will eventually produce a data overrun. Similarly, continuous-data rates of 9599.9999 baud and 9600.0001 baud for the source and sink, respectively, will eventually produce a data underrun. Both overrun and underrun conditions produce errors in the data stream, and are therefore highly undesirable.

Variations in data arrival rates in multi-source and/or multi-sink systems pose similar problems in that they may lead to overrun and/or underrun conditions. Where either a data source or a data sink (or both) is in motion, the doppler effect may contribute to variations in data arrival rates.

In conventional communication systems, these problems are typically partially or wholly corrected in hardware. Such hardware corrections increase significantly the complexity of the system, with an associated increase in cost. A typical hardware correction utilizes clock lines to synchronize the data rate clocks in both the data source and the data sink. Data flow proceeds through such a system in lock step with this common synchronizing clock. In this manner, overrun and underrun conditions are eliminated at the expense of system complexity and cost.

In some cases, it is impractical or impossible to synchronize the data rate clocks in hardware. For example, with a software-defined radio, it is generally undesirable to utilize a hardware synchronization scheme in an otherwise software environment because it promotes the dependence of software on hardware in particular architectures. Software then becomes more complex to develop and is more difficult to port to other hardware platforms.

In such cases, elaborate schemes have been developed to synchronize the clocks by transmission. Such schemes typically suffer errors due to transmission delays and doppler shifts, as well as the expense and complexity of implementation.

Conventionally, a FIFO buffer is used to synchronize input and output data rates. This is typically done by interrupting the input data flow (when the input data rate is greater than the output data rate) or the output data flow (when the output data rate is greater than the input data rate) to compensate for rate differences. This produces discontinuous data, which itself may produce overrun or underrun conditions. Such discontinuous data also inhibits proper operation of the data source and/or data sink when continuous data is produced or expected.

What is needed, therefore, is a simple and straightforward method of implementing data-rate regulation in software. Such a method should be capable of compensating for mismatches between the source data rate and the sink data rate. Also, such a method should be capable of easily compensating for variations in data arrival times. Additionally, such a method should prevent data overrun and underrun conditions when the data is continuous over long periods of time.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
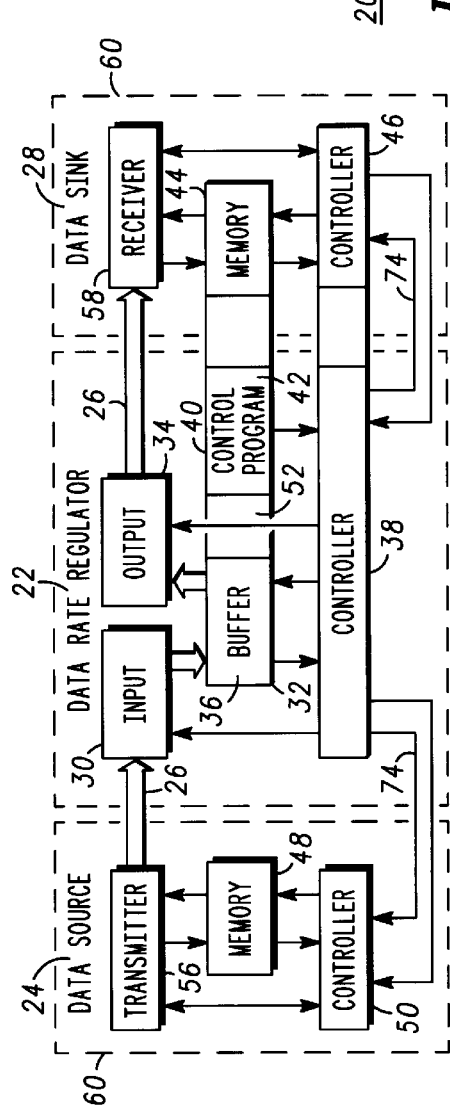
FIG. 1 shows a block diagram depicting a communication system incorporating a data-rate regulator in accordance with a preferred embodiment of the present invention.

FIG. 1 shows a block diagram depicting a software-defined communication system 20 incorporating a data-rate regulator 22 in accordance with a p referred embodiment of the present invention.

In the exemplary embodiment of FIG. 1, system 20 has a data source 24 configured to transmit data 26 at a source data rate (not shown). Likewise, system 20 has a data sink 28 configured to receive data 26 at a sink data rate (not shown). Due to the use of real-world components, the source data rate and the sink data rate are not precisely identical, e.g., 9600.0000 baud. Consequently, data-rate regulation and/or synchronization are performed to prevent overrun and underrun conditions.

It should be noted that, for the purposes of this discussion, exemplary data rates of 9600 baud are utilized. Those skilled in the art will appreciate, however, that these are exemplary data rates only, and that data rates of any baud may be used without departing from the spirit of the present invention.

In practise, source and sink data rates are derived from data-rate generators within data source 24 and data sink 28. A typical data-rate generator utilizes a crystal and a divider to obtain the desired data rate. Because of tolerances in crystals, it is not normally possible to obtain a data-source crystal and a data-sink crystal that are perfectly matched in frequency, as well as thermal, pressure, and other characteristics. Therefore, for the sake of discussion, if the source data rate of system 20 were to be exactly 9600 baud at a given instant, then the sink data rate at that instant, while within a tolerance of the data-sink crystal, is virtually guaranteed to not be exactly 9600 baud.

In the preferred embodiment, data-rate regulator 22 is inserted into system 20 between data source 24 and data sink 28. Data 26 is transmitted by data source 24, received in data-rate regulator 22 by an input function 30, and written into a buffer 32 at the source data rate.

Similarly, data 26 is read from buffer 32, transmitted from data-rate regulator 22 by an output function 34, and received by data sink 28 at the sink data rate. Data 26 is therefore written into buffer 32 at the source data rate and read from buffer 32 at the sink data rate. In the preferred embodiment, buffer 32 is realized within a portion 36 of controller-readable memory. Input function 30, output function 34, and buffer memory portion 36 (i.e., buffer 32) are coupled to and under the control of a controller 38. Controller 38 is coupled to and under the control of a control program 40 realized within another portion 42 of controller-readable memory. It is control program 40, acting through controller 38, that controls and regulates the flow of data 26 between data source 24 and data sink 28, i.e., through data-flow regulator 22.

FIG. 1 depicts buffer memory portion 36 and/or control-program memory portion 42 as coupled to and/or a portion of a memory 44 within data sink 28. This depiction represents a preferred embodiment where data-rate regulator 22, while logically separate, is physically incorporated into data sink 28, i.e., is located within a radio receiver of system 20. In such a case, buffer memory portion 36 and/or control-program memory portion 42 may be portions of and share a common memory address space (not shown) with data sink memory 44.

Similarly, FIG. 1 depicts controller 38 as coupled to and a portion of a controller 46 within data sink 28. This depiction represents a preferred embodiment where data-rate regulator 22 is physically incorporated into data sink 28. In this embodiment, regulator controller 38 and data-sink controller 46 may be the same controller or processor, with control-program 40 serving as a routine within a greater control program (not shown) contained within data-sink memory 44.

Those skilled in the art will appreciate that the embodiment depicted in FIG. 1 is exemplary only. It is not a requirement of the present invention that data-rate regulator 22 be physically incorporated into data sink 28. Under some circumstances, it may be more desirable to physically incorporate data-rate regulator 22 into data source 24, or to physically have data-rate regulator 22 realized as an independent device.

Were data-rate regulator 22 to be physically incorporated into data source 24, buffer memory portion 36 and/or control-program memory portion 42 may be coupled to and/or a portion of a memory 48 within data source 24. Buffer memory portion 36 and/or control-program memory portion 42 may therefore be portions of and share a common memory address space (not shown) with data-source memory 48.

Similarly, controller 38 may be coupled to and a portion of a controller 50 within data source 24. Regulator controller 38 and data-source controller 50 may therefore be the same controller or processor, with control-program 40 serving as a routine within a greater control program (not shown) contained within data-source memory 48.

Figure 2:
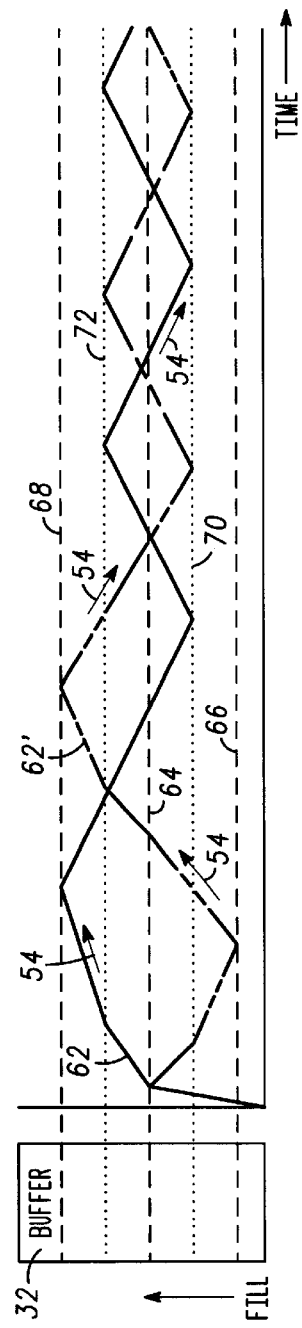
FIG. 2 shows a schematic view depicting a data-rate regulation buffer with a diagram of buffer level over time in accordance with a preferred embodiment of the present invention.
Figure 3:
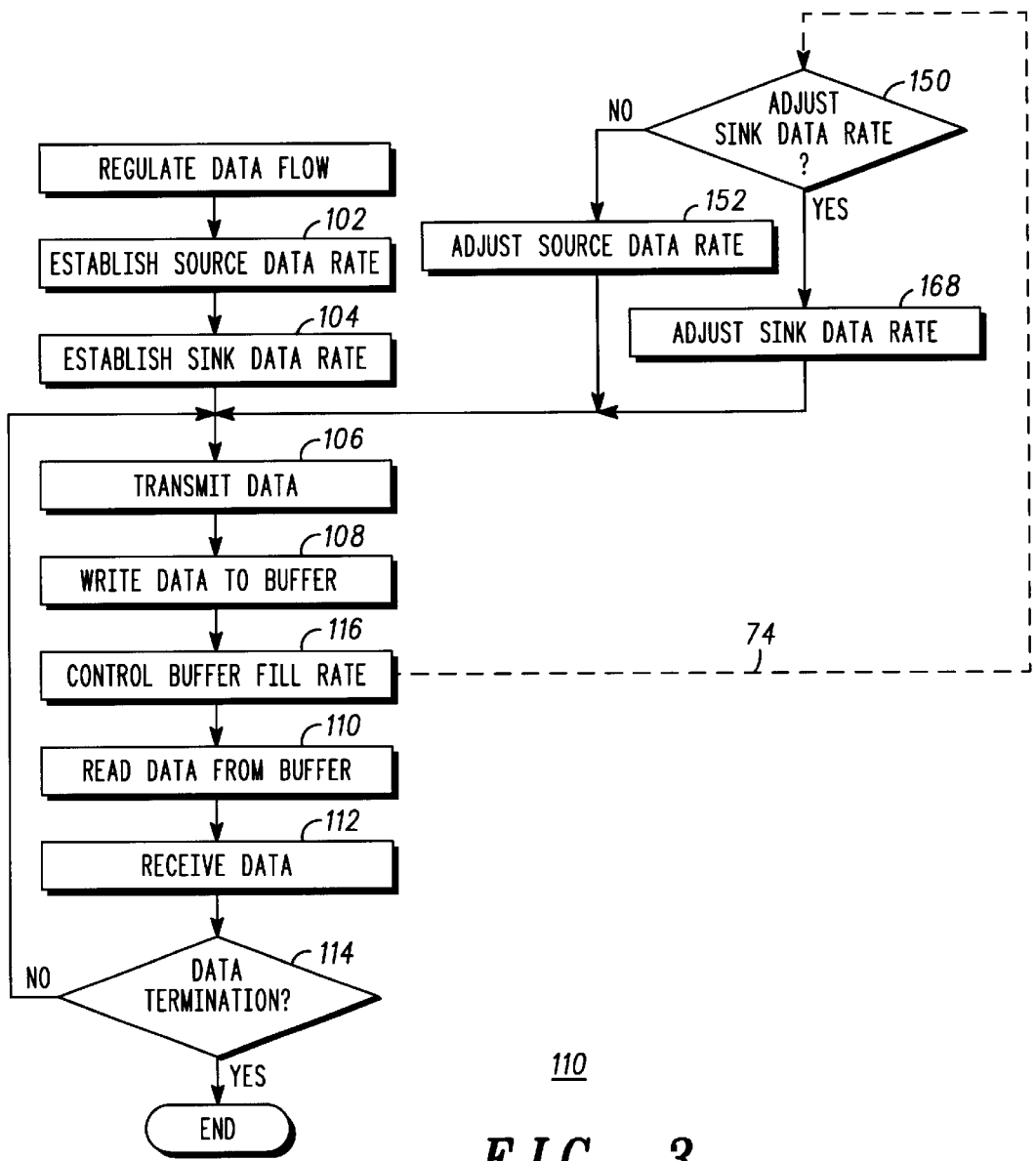
FIG. 3 shows a flow chart depicting a process to regulate a flow of data in the system depicted in FIG. 1 in accordance with a preferred embodiment of the present invention.

Were data-rate regulator 22 to be realized as an independent device, buffer memory portion 36 and/or control-program memory portion 42 are portions of an independent memory 52 within data-rate regulator 22. Buffer memory portion 36 and/or control-program memory portion 42 share a common memory address space (not shown) addressable by controller 38. Controller 38 is an independent controller or processor within data-rate regulator 22. FIG. 2 shows a schematic view depicting buffer 32 with a data-flow diagram therefor in accordance with a preferred embodiment of the present invention. FIG. 3 shows a flow chart depicting a process 100 to regulate a flow of data 26 in system 20 in accordance with a preferred embodiment of the present invention. The following discussion refers to FIGS. 1 through 3.

In data-flow regulation process 100 (FIG. 3), a task 102 establishes an initial value for the source data rate in data source 24. Similarly, a task 104 establishes an initial value for the sink data rate. Tasks 102 and 104 establish the source and sink data rates to a value greater than zero (the data rates always exist) and substantially equal to a predetermined data rate (not shown). For example, if the predetermined data rate is to be a theoretically perfect 9600 baud, then the source and sink data rates are set as close to this value as possible given the tolerances of the components involved. A transmitter (XMTR) 56 (FIG. 1) in data source 24 is now set to transmit data 26 at the source data rate of substantially 9600 baud, and a receiver (RCVR) 58 (FIG. 1) in data sink 28 is now set to receive data 26 at the sink data rate of substantially 9600 baud. It will be appreciated that, in all probability, neither the source data rate nor the sink data rate will be exactly 9600 baud.

Those skilled in the art will appreciate that tasks 102 and 104 are independent of each other and may be performed in either order. Likewise, it will be appreciated that, once tasks 102 and 104 establish the source and sink data rates, those data rates continue to be as established until altered by another task.

Data 26 is continuous. In a task 106 (FIG. 3), data source 24 (FIG. 1) transmits data 26 at the source data rate. In a following task 108, input function 30 of data-rate regulator 22 receives data 26 and writes data 26 to buffer 32, also at the source data rate. Since data 26 is continuous (after inception thereof), tasks 106 and 108 continuously transfer data 26 from data source 24 to buffer 32 at the source data rate without interruption. That is, even though the source data rate may inadvertently change due to variations in temperature, pressure, and other factors, or may intentionally be changed as discussed hereinafter, the source data rate is always substantially equal to the predetermined data rate and never nears zero.

Those skilled in the art will appreciate that data 26 may be packetized, i.e., as bursts of data interleaved with spaces. By being packetized, multiplexing may be applied to allow the use of a plurality of data termini 60 (data sources 24 or data sinks 28), each having a terminus (source or sink) data rate (not shown). Within each data packet (not shown), the data rate is typically much higher than the terminus data rate as defined herein. For the purposes of this discussion, however, such packetized data may be considered to be continuous if the average terminus data rate of each data packet and its accompanying space is substantially equal to the terminus data rate and does not near zero. That is, when each packet is expanded to fill the following space, the resultant terminus data rate is reduced to the original terminus data rate, i.e., the data becomes continuous at the terminus data rate. It will be appreciated that either the source or the sink data (or both) may be packetized without departing from the spirit of the present invention. For purposes of this discussion, however, continuous data 26 will be assumed for both data source 24 and data sink 28.

Following task 108 a subprocess 116 controls a buffer fill rate 54. The operation of subprocess 116 is discussed in detail hereinafter.

In a task 110 (FIG. 3), output function 34 (FIG. 1) of data-rate regulator 22 reads data 26 from buffer 32 and transmits data 26 to data sink 28 at the sink data rate. In a following task 112, data sink 28 receives data 26, also at the sink data rate. Since, after inception, data 26 is continuous, tasks 110 and 112 continuously transfer data 26 from buffer 32 to data sink 28 at the sink data rate without interruption. That is, even though the sink data rate may inadvertently change due to variations in temperature, pressure, and other factors, or may intentionally be changed as discussed hereinafter, the sink data rate is always substantially equal to the predetermined data rate and never nears zero.

Since even continuous data may be subject to termination (the data is continuous from beginning to end), a query task 114 determines if an end of data 26 has been reached. If task 114 determines that a data termination condition exists, then controller 38 informs control program 40 so the next data 26 may be treated as initialization of data.

If task 114 determines that data 26 is continuous, i.e. a data termination condition does not exist, then process 100 continues with tasks 106, 108, 116, 110, and 112. Those skilled in the art will appreciate that tasks 106, 108, 116, 110, and 112 are performed substantially simultaneously as long as data 26 is continuous and in a steady-state condition, i.e., between initialization and termination.

Figure 4:
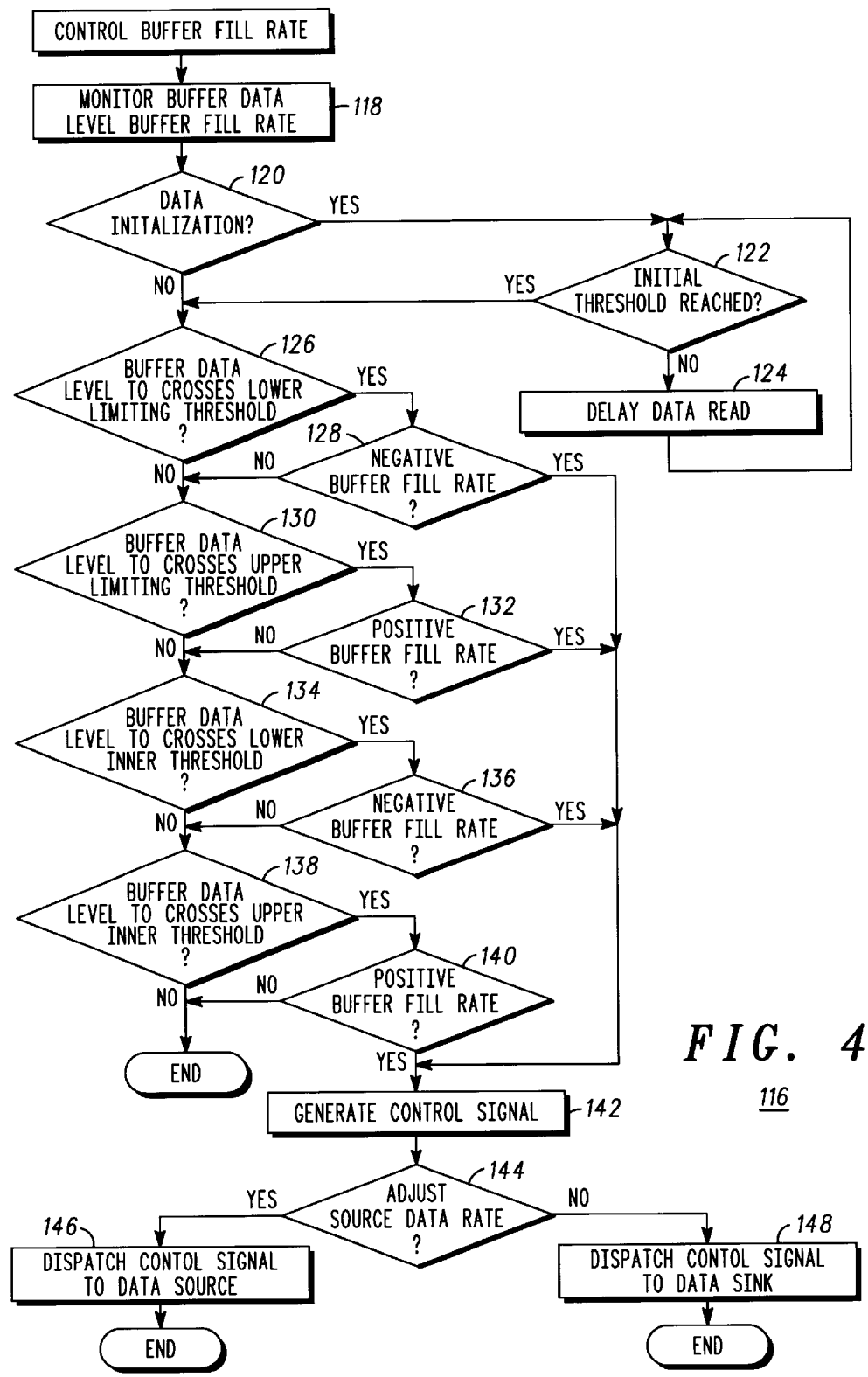
FIG. 4 shows a flow chart depicting a subprocess to control a buffer fill rate for the process of FIG. 3 in accordance with a preferred embodiment of the present invention.

FIG. 4 shows a flow chart depicting subprocess 116 to control buffer fill rate 54 for process 100 in accordance with a preferred embodiment of the present invention. The following discussion refers to FIGS. 1 through 4.

Between writing task 108 and reading task 110, process 100 executes subprocess 116 (FIGS. 3 and 4) to control buffer fill rate 54. In a task 118 (FIG. 4), controller 38 continuously monitors a buffer data level 62, i.e., the amount of data 26 in buffer 32 from moment to moment, and buffer fill rate 54, i.e., the rate at which data 26 is filling buffer 32. Since buffer fill rate 54 is a rate of fill, buffer fill rate 54 is positive (i.e., the slope of buffer data level 62 in FIG. 2 extends from lower left to upper right) when buffer 32 is being filled. Likewise, buffer fill rate 54 is negative (i.e., the slope of buffer data level 62 in FIG. 2 extends from upper left to lower right) when buffer 32 is being emptied. It will be appreciated that since, in all probability, the source data rate and the sink data rate will not be exactly equal, buffer fill rate 54 will, in all probability, never be zero. Those skilled in the art will appreciate that there are several ways in which controller 38 may monitor buffer fill rate 54. For example, controller 38 may monitor buffer data level 62 by sampling, in which decreasing buffer data levels 62 indicate a negative buffer fill rate 54. Likewise, controller 38 may monitor the source data rate and the sink data rate. Throughout this discussion, buffer fill rate 54 is taken to be equal to the difference of the source data rate less the sink data rate, i.e., $R_{Fill}=R_{Source}-R_{Sink}$. In the preferred embodiment, buffer fill rate 54 is changed as a consequence of changing the source data rate or the sink data rate. The change in buffer fill rate may not be instantaneous. Those skilled in the art will appreciate that other calculations to obtain buffer fill rate 54 may be used if appropriate care is taken to determine fill-rate polarity. The use of these or other methods of determining buffer fill rate 54 and the sign thereof does not depart from the spirit of the present invention.

A query task 120 determines if data initialization is taking place, i.e., if task 108 is writing the beginning of a stream of data 26 into buffer 32. If initialization is taking place, then a query task 122 determines if buffer data level 62 (FIG. 2) has reached an initial data-level threshold 64 (FIG. 2). If buffer data level 62 has not reached initial data-level threshold 64, then a task 124 delays or inhibits the execution of reading task 110.

Those skilled in the art will appreciate that tasks 120, 122, and 124 serve to delay or inhibit the reading of data 26 from buffer 32 during initialization until buffer data level 62 has reached initial data-level threshold 64. Initial data-level threshold 64 lies between a lower limiting data-level threshold 66 (FIG. 2) and an upper limiting data-level threshold 68 (FIG. 2). Writing task 108 increases buffer data level 62 while reading task 110 decreases buffer data level 62. Since, for purposes of the present discussion, buffer fill rate 54 is the difference of the source data rate less the sink data rate inhibiting reading task 110 allows buffer 32 to fill at the source data rate, i.e., at a maximum of buffer fill rate 54, until buffer data level 62 reaches initial data-level threshold 64.

Those skilled in the art will appreciate that there are several ways to perform the data initialization and set an initial threshold. For example, the initial threshold reached query task 122 may check for a set time delay rather than a buffer level. The use of these or other methods of determining that the data initialization is complete does not depart from the spirit of the present invention.

If the initial source data rate is greater than the initial sink data rate, then buffer fill rate 62 will be positive immediately after initialization. This is depicted in FIG. 2 by the solid line 62 representing the buffer fill rate. Conversely, if the initial source data rate is less than the initial sink data rate, then buffer fill rate 62 will be negative immediately after initialization. This is depicted in FIG. 2 by the dot-dash line 62' representing the buffer fill rate. By positioning initial data-level threshold 64 between upper and lower limiting data-level thresholds 66 and 68, potential threshold-crossing errors for buffer fill rate 62 or 62' are eliminated. During steady-state operation, i.e., between initialization and termination, buffer fill rates 62 and 62' are treated identically. Only buffer fill rate 62 will be utilized in the remainder of this discussion.

When buffer data level 62 has reached initial data-level threshold 64, task 110 reads data 26 from buffer 32 and buffer fill rate 54 is either positive (i.e., the source data rate is greater than the sink data rate) or negative (i.e., the sink data rate is greater than the source data rate). The transfer of data 26 through buffer 32 is now continuous, and will continue so until data termination.

By positioning initial data-level threshold between lower and upper limiting data-level thresholds 66 and 68, buffer 32 is prevented from becoming either empty or full (i.e., buffer data level 62 is therefore maintained between lower and upper limiting data-level thresholds 66 and 68) as discussed hereinafter, thus preventing either data underrun or overrun conditions from occurring.

In association with tasks 126, 128, 130, and 132 (FIG. 4), buffer 32 (FIGS. 1 and 2) has two limiting data-level thresholds 66 and 68 (FIG. 2). In response to control program 40, controller 38 maintains buffer data level 62 between lower and upper limiting data-level thresholds 66 and 68 by causing variations in the source or sink data rate as required. Lower limiting data-level threshold 66 represents a lower limit for buffer data level 62, i.e., the minimum value buffer data level 62 may attain between data initialization and data termination. When buffer fill rate 54 is negative (i.e., buffer data level 62 is decreasing) and buffer data level 62 reaches lower limiting data-level threshold 66, then controller 38 causes buffer fill rate 54 to become positive.

Similarly, upper limiting data-level threshold 68 represents an upper limit for buffer data level 62, i.e., the maximum value buffer data level 62 may attain between data initialization and data termination. When buffer fill rate 54 is positive (i.e., buffer data level 62 is increasing) and buffer data level 62 reaches upper limiting data-level threshold 68, then controller 38 causes buffer fill rate 54 to become negative.

In association with tasks 134, 136, 138, and 140 (FIG. 4), buffer 32 has two additional data-level thresholds 70 and 72. Five data-level thresholds (64, 66, 68, 70, and 72) are depicted in the preferred embodiment of FIG. 2. Those skilled in the art will appreciate that additional data-level thresholds beyond the initial and limiting data-level thresholds 64, 66, and 68 are not a requirement for the present invention. The use of five, seven, nine, or any number of data-level thresholds does not depart from the spirit of the present invention.

Lower inner data-level threshold 70 is located between lower and upper limiting data-level thresholds 66 and 68, preferably below initial data-level threshold 64. Upper inner data-level threshold 72 is located between lower inner data-level threshold 70 and upper limiting data-level threshold 68, preferably above initial data-level threshold 64.

Lower inner data-level threshold 70 represents an intermediate lower limit for buffer data level 62. When buffer fill rate 54 is negative and buffer data level 62 reaches lower limiting data-level threshold 70, then controller 38 causes buffer fill rate 54 to become less negative. Buffer fill rate 54 may or may not become positive.

Similarly, upper inner data-level threshold 72 represents an intermediate upper limit for buffer data level 62. When buffer fill rate 54 is positive and buffer data level 62 reaches upper inner data-level threshold 72, then controller 38 causes buffer fill rate 54 to become less positive. Buffer fill rate 54 may or may not become negative.

When the flow of data 26 between data source 24 and data sink 28 is continuous, i.e., when task 120 has determined that initialization is not taking place or task 122 has determined that initialization has been completed, then subprocess 116 proceeds with query tasks 126 and 128 (FIG. 4). Tasks 126 and 128 form a logical AND decision pair, as do tasks 130 and 132, 134 and 136, and 138 and 140 discussed hereinafter.

If task 126 determines that buffer data level 62 (FIG. 2) crosses the lower limiting data-level threshold 66 (FIG. 2) AND task 128 determines that buffer fill rate 54 (FIG. 2) is negative, then subprocess 116 proceeds to task 142.

If task 126 determines that buffer data level 62 has not crossed the lower limiting data-level threshold 66, OR if task 128 determines that buffer fill rate 54 is not negative, then subprocess 116 proceeds with query tasks 130 and 132 (FIG. 4).

If task 130 determines that buffer data level 62 has crossed the upper limiting data-level threshold 68 AND task 132 determines that buffer fill rate 54 is positive, then subprocess 116 proceeds to task 142.

If task 130 determines that buffer data level 62 has not crossed the upper limiting data-level threshold 68, OR if task 132 determines that buffer fill rate 54 is not positive, then subprocess 116 proceeds with query tasks 134 and 136 (FIG. 4).

If task 134 determines that buffer data level 62 has crossed the lower inner data-level threshold 70 (FIG. 2) AND task 136 determines that buffer fill rate 54 (FIG. 2) is negative, then subprocess 116 proceeds to task 142.

If task 134 determines that buffer data level 62 has not crossed the lower inner data-level threshold 70, OR if task 136 determines that buffer fill rate 54 is not negative, then subprocess 116 proceeds with query tasks 138 and 140 (FIG. 4).

If task 138 determines that buffer data level 62 has crossed the upper inner data-level threshold 72 AND task 140 determines that buffer fill rate 54 is positive, then subprocess 116 proceeds to task 142.

If task 138 determines that buffer data level 62 has not crossed the upper inner data-level threshold 72, OR if task 140 determines that buffer fill rate 54 is not positive, then subprocess 116 is complete and control returns to process 100 (FIG. 3).

If the AND logic of task pairs 126 and 128, 130 and 132, 134 and 136, or 138 and 140 is true, then subprocess 116 proceeds to task 142. Conversely, if the AND logic of all of the task pairs is false, then subprocess 116 is done for the current iteration of process 100 (FIG. 3).

In task 142, subprocess 116 generates a rate-control signal 74 (FIGS. 1 and 3). If task 142 immediately follows task 128 or task 132, then rate-control signal 74 contains a first-order rate-change request (not shown). In response to a first-order rate-change request, the data terminus 60 that is the target of rate-control signal 74 (i.e., data source 24 or data sink 28) (FIG. 1) will alter the terminus (source or sink) data rate so as to change the polarity of buffer fill rate 54.

If task 142 immediately follows task 136 or task 140, then rate-control signal 74 contains a second-order rate-change request (not shown). In response to a second-order rate-change request, data terminus 60 will alter the terminus data rate so as to decrease the amount of buffer fill rate 54 in the current polarity, even if that amount of decrease causes a change in the polarity of buffer fill rate 54.

Following task 142, a query task 144 determines if data terminus 60 is data source 24 or data sink 28. If data terminus 60 is data source 24, a task 146 dispatches rate-control signal 74 to data source 24. If data terminus 60 is data sink 28, a task 148 dispatches rate-control signal 74 to data sink 28. Following tasks 146 or 148, subprocess 116 is complete and control returns to process 100 (FIG. 3).

If, as a result of subprocess 116, rate-control signal 74 is dispatched to data terminus 60 (FIG. 1), a query task 150 (FIG. 3) determines if data terminus 60 is data source 24 or data sink 28. If data terminus 60 is data source 24, a subprocess 152 adjusts the source data rate. If data terminus 60 is data sink 28, a subprocess 168 adjusts the sink data rate.

Figure 5:
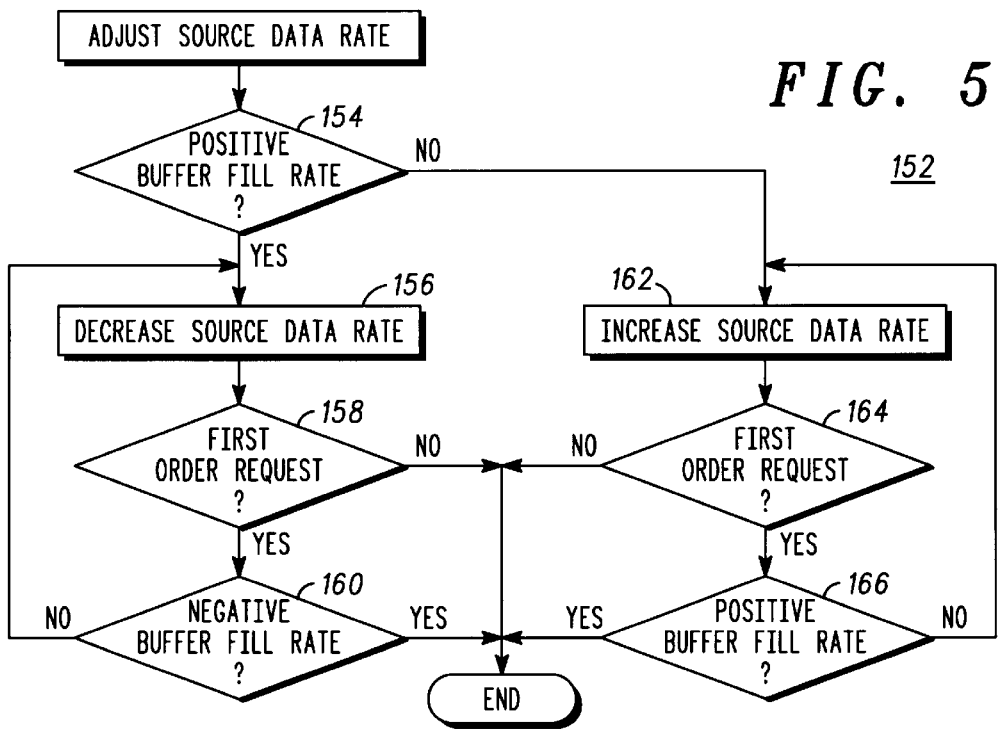
FIG. 5 shows a flow chart depicting a subprocess to establish a source data rate for the process of FIG. 3 in accordance with a preferred embodiment of the present invention.
Figure 6:
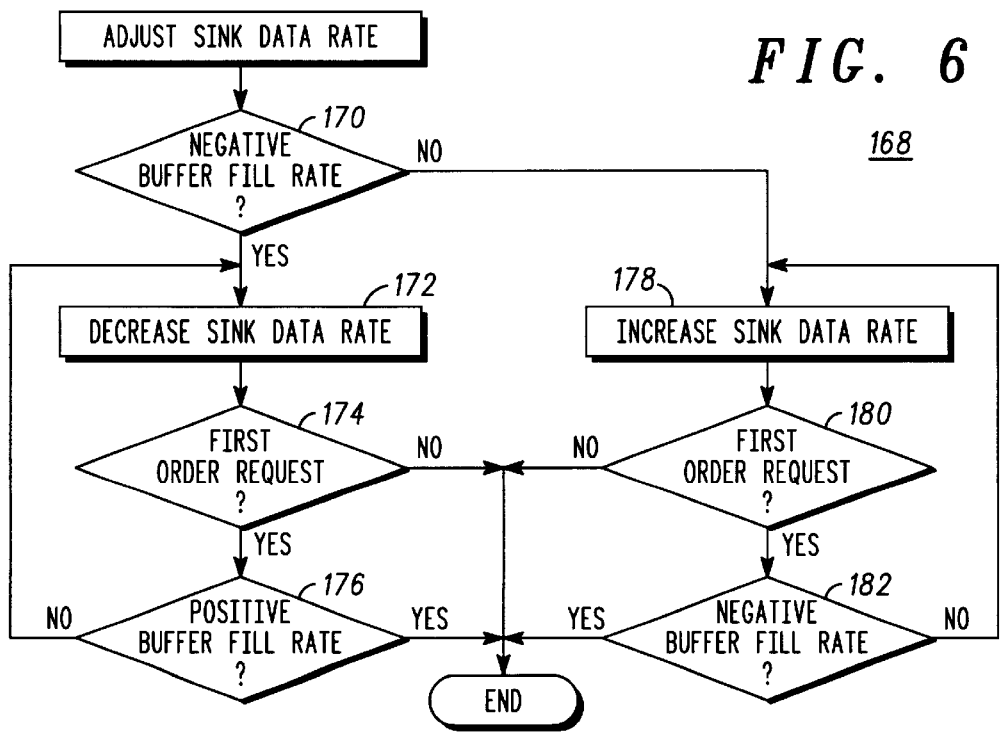
FIG. 6 shows a flow chart depicting a subprocess to establish a sink data rate for the process of FIG. 3 in accordance with a preferred embodiment of the present invention.

Those skilled in the art will appreciate that data terminus 60 may be either data source 24, data sink 28, or both. When data terminus 60 is always data source 24, then rate-control signal 74 is always dispatched to data source 24 by task 146 (FIG. 4), and only the data source rate is adjusted by subprocess 152 (FIGS. 3 and 5). In this case, task 144 (FIG. 4), task 148 (FIG. 4), task 150 (FIG. 3), and subprocess 168 (FIGS. 3 and 6) are superfluous and may be eliminated. Similarly, when data terminus 60 is always data sink 28, then rate-control signal 74 is always dispatched to data sink 28 by task 146, and only the data sink rate is adjusted by subprocess 168 (FIGS. 3 and 6). In this case, task 144 (FIG. 4), task 146 (FIG. 4), task 150 (FIG. 3), and subprocess 152 (FIGS. 3 and 5) are superfluous and may be eliminated. The elimination of either data source 24 or data sink 28 as data terminus 60 does not depart from the spirit of the present invention.

FIG. 5 shows a flow chart depicting subprocess 152 to establish the source data rate for process 100 in accordance with a preferred embodiment of the present invention. If data terminus 60 is data source 24 (FIG. 1), then subprocess 152 (FIGS. 3 and 5) adjusts the source data rate. Within subprocess 152, a query task 154 (FIG. 5) determines if buffer fill rate 54 (FIG. 2) is positive or negative.

If task 154 determines that buffer fill rate 54 is positive, i.e., the source data rate is greater than the sink data rate, then a task 156 decreases the source data rate by one increment (discussed in detail hereinbelow). This adds a negative component to buffer fill rate 54. A query task 158 then determines if rate-control signal 74 (FIGS. 1 and 3) contains the first-order rate-change request (discussed hereinbefore). If so, a query task 160 determines if buffer fill rate 54 has changed signs (i.e., is negative). If no, tasks 156 and 158 are repeated until buffer fill rate 54 changes signs.

If task 154 determines that buffer fill rate 54 is negative, i.e., that the source data rate is less than the sink data rate, then a task 162 increases the source data rate by one increment. This adds a positive component to buffer fill rate 54.

A query task 164 then determines if rate-control signal 74 contains a first-order rate-change request. If so, a query task 166 determines if buffer fill rate 54 has changed signs (i.e., is negative). If no, tasks 162 and 164 are repeated until buffer fill rate 54 changes signs.

If task 158 or 164 determines that rate-control signal 74 contains a second-order rate-change request (discussed hereinbefore), or if task 160 or 166 determines that buffer fill rate 54 has changed signs, then subprocess 152 is complete and control returns to process 100 (FIG. 3).

FIG. 6 shows a flow chart depicting subprocess 168 to establish the sink data rate for process 100 in accordance with a preferred embodiment of the present invention. The following discussion refers to FIGS. 1 through 4 and 6.

If data terminus 60 is data sink 28 (FIG. 1), then subprocess 168 (FIGS. 3 and 6) adjusts the sink data rate. Within subprocess 168, a query task 170 (FIG. 6) determines if buffer fill rate 54 (FIG. 2) is negative or positive. If task 170 determines that buffer fill rate 54 is negative, i.e., that the sink data rate is greater than the source data rate, then a task 172 decreases the sink data rate by one increment (discussed hereinafter). This adds a negative component to buffer fill rate 54.

A query task 174 then determines if rate-control signal 74 (FIGS. 1 and 3) contains the first-order rate-change request (discussed hereinabove). If so, a query task 176 determines if buffer fill rate 54 has changed signs (i.e., is positive). If no, tasks 172 and 174 are repeated until buffer fill rate 54 changes signs.

If task 170 determines that buffer fill rate 54 is positive, i.e., the sink data rate is less than the source data rate, then a task 178 increases the source data rate by one increment. This adds a positive component to buffer fill rate 54.

A query task 180 then determines if rate-control signal 74 contains a first-order rate-change request. If so, a query task 182 determines if buffer fill rate 54 has changed signs (i.e., is negative). If no, tasks 178 and 180 are repeated until buffer fill rate 54 changes signs.

If task 174 or 180 determines that rate-control signal 74 contains a second-order rate-change request, or if task 176 or 182 determines that buffer fill rate 54 has changed signs, then subprocess 168 is complete and control returns to process 100 (FIG. 3).

It will be appreciated by those skilled in the art that the adjustment increments discussed hereinabove in association with tasks 156, 162, 172, and 178 (FIGS. 5 and 6) are arbitrary. That is, any increment convenient to the specific application may be used as long as that increment does not cause the terminus data rate to near zero. Preferably, the increment is less than fifty percent of the predetermined baud rate. In the desired embodiment, for example, if the source or sink data rate is produced by a crystal oscillator and a digital divider, the increment may well be one step of the divider. The use of increments of any given size is within the spirit of the present invention.

Furthermore, those skilled in the art will appreciate that the purpose of the first order request processing associated with tasks 158, 160, 164, 166, 174,176, 180 and 182 is to prevent buffer underun and overflow conditions and may be accomplished by other means, e.g. sending a single large adjustment. The use of other methodologies does not depart from the spirit of the present invention.

Those skilled in the art will also appreciate that the methods of detecting a need for a terminus data rate adjustment and the methods for effecting that adjustment described herein are exemplary of a preferred embodiment of the present invention. The use of other methodologies does not depart from the spirit of the present invention.

In summary, the present invention teaches a method of regulating a flow of data in a communication system and an apparatus therefor. The method is simple and straightforward process of implementing such a data-rate regulation in software. This process is suitable for use with conventional software-determined radios and other programmable devices. The process is capable of compensating for mismatches between the source data rate and the sink data rate, as well as variations in data arrival times. The process prevents of data overrun and underrun conditions when used to control the flow of continuous data over long periods of time.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of regulating a flow of data in a communication system, said method comprising:

a) establishing a source data rate greater than zero in a data source;

b) establishing a sink data rate greater than zero in a data sink;

c) transmitting said data at said source data rate by said data source;

d) writing said data into a buffer at said source data rate, wherein said writing activity
d) increases a level of said data within said buffer;
e) reading said data from said buffer at said sink data rate, wherein said reading activity e) decreases said buffer data level;
f) receiving said data at said sink data rate by said data sink;
g) monitoring a fill rate of said buffer and said buffer data level, wherein said fill rate is a difference of said source data rate less said sink data rate; and
h) dispatching a rate-control signal to adjust said source data rate when said monitoring determines one of said fill rate is negative and said buffer data level is less than or equal to a lower data-level threshold and said fill rate is positive and said buffer data level is greater than or equal to an upper data-level threshold.

2. A data-flow regulation method as claimed in claim 1, further comprising
dispatching said rate control signal to adjust said sink data rate, when said monitoring determines one of said said fill rate is negative and said buffer data level is less than or equal to said lower data-level threshold and said buffer fill rate is positive and said buffer data level is greater than or equal to an upper data level threshold.

3. A data-flow regulation method as claimed in claim 2 wherein:
said establishing activity a) initially establishes said source data rate substantially equal to a predetermined data rate; and
said establishing activity b) initially establishes said sink data rate substantially equal to said predetermined data rate.

4. A data-flow regulation method as claimed in claim 3 wherein:
said dispatching said rate control signal to adjust said source data rate is configured to adjust said source data rate to within fifty percent of said predetermined data rate.

5. A data-flow regulation method as claimed in claim 2, wherein, when said monitoring determines said fill rate is negative and said buffer data level is less than or equal to said lower data-level threshold, one of said dispatching said rate control signal to adjust said source data rate and dispatching said rate control signal to adjust said sink data rate adjusts one of said source and sink data rates so that said source data rate is greater tan said sink data rate.

6. A data-flow regulation method as claimed in claim 2, wherein, when said monitoring determines said fill rate is positive and said buffer data level is greater than or equal to said upper data-level threshold, one of said dispatching said rate control signal to adjust said source data rate and dispatching said rate control signal to adjust said sink data rate adjusts said one of source and sink data rates so that said sink data rate is greater than said source data rate.

7. A data-flow regulation method as claimed in claim 2 wherein:
said lower data-level threshold is a first lower data-level threshold;
said upper data-level threshold is a first upper data-level threshold;
said buffer has a second lower data-level threshold between said first lower data-level threshold and said first upper data-level threshold;
said buffer has a second upper data-level threshold between said second lower data-level threshold and said first upper data-level threshold;
said rate-control signal containing a first rate-change request when said monitoring determines that said fill rate is negative and said buffer data level is less than or equal to said second lower data-level threshold and said fill rate is positive and said buffer data level is greater than or equal to said second upper data-level thresholds;
said rate-control signal containing a second rate-control change request when said monitoring determines that said fill rate is negative and said buffer data level is less than or equal to said first lower data-level threshold and said fill rate is positive and said buffer data level is greater than or equal to said second upper data-level thresholds;
said source and sink data rates configured for adjustment by a first amount when said rate-control signal contains said first rate-change request and by a second amount when said rate-control signal contains said second rate-change request wherein said second amount is greater than said first amount.

8. A data-flow regulation method as claimed in claim 1 wherein:
said transmitting activity c) substantially continuously transmits said data; and
said receiving activity f) substantially continuously receives said data.

9. A data-flow regulation method as claimed in claim 8 wherein:
said writing activity d) substantially continuously writes said data into said buffer; and
said reading activity e) substantially continuously reads said data from said buffer.

10. A data-flow regulation method as claimed in claim 1 wherein said reading activity e) is delayed until said buffer data level reaches an initial data-level threshold, said initial data-level threshold lying between said lower and upper data-level thresholds.

11. A data-flow regulation method as claimed in claim 1 wherein:
said transmitting activity c) transmits said data as discrete packets of said data having an average source data rate substantially equal to said source data rate; and
said receiving activity f) receives said data as a substantially continuous stream of said data at said sink data rate.

12. A data-flow regulation method as claimed in claim 1 wherein:
said transmitting activity c) transmits said data as a substantially continuous stream of said data at said source data rate; and
said receiving activity f) receives said data as discrete packets of said data having an average sink data rate substantially equal to said sink data rate.

13. A data-flow regulation method as claimed in claim 1 wherein said reading activity e) is delayed a timed amount such that said buffer data level reaches an initial data-level threshold, said initial data-level threshold lying between said lower and upper data-level thresholds.

14. An apparatus for regulating a flow of data between portions of a communication system, said apparatus comprising:
a first controller-readable portion configured as a buffer;
a second controller-readable memory portion configured to contain a control program;
a data source configured to transmit said data at a source data rate greater than zero;

an input function coupled between said data source and said first memory portion, configured to receive said data from said data source at said source data rate, and configured to add to a level of said data within said buff by writing said data to said buffer at said source data rate;

an output function coupled between said first memory portion and said data sink, configured to subtract from said buffer data level by reading said data from said buffer at a sink data rate greater than zero, and configured to transmit said data to said data sink;

a data sink configured to receive said data at said sink data rate; and a controller coupled to said first and second memory portions, coupled to said input and output functions, and configured to:

monitor a fill rate of said buffer and said buffer data level in response to said control program, said fill rate being a difference of said source data rate less said sink data rate; and dispatch a rate-control signal to adjust said source data rate when said monitoring determines one of said fill rate is negative and said buffer data level is less than or equal to a lower data-level threshold and said fill rate is positive and said buffer data level is greater than or equal to an upper data-level threshold.

15. A data-flow regulation apparatus as claim in claim 14, said controller is further configured to dispatche said rate-control signal to adjust said sink data rate when one of said fill rate is negative and said buffer data level is less than or equal to a lower data-level threshold and said fill rate is positive and said buffer data level is greater than or equal to an upper data-level threshold.

16. A data-flow regulation apparatus as claimed in claim 15 wherein:

when said controller determines said fill rate is negative and said buffer data level is less than or equal to said lower data-level threshold, said controller is configured to dispatch said rate-control signal to adjusts said source data rate so that said source data rate is greater than said sink data rate;

when said controller determines said fill rate is positive and said buffer data level is greater than or equal to said upper data-level threshold, said controller is configured to dispatch said rate-control signal to adjusts said source data rate so that said source data rate is less than said sink data rate.

17. A data-flow regulation apparatus as claimed in claim 16 wherein:

when said controller determines said fill rate is negative and said buffer data level is less than or equal to a lower inner data-level threshold between said lower data-level threshold and said upper data-level threshold, said controller is configured to dispatch said rate-control signal to adjusts source data rate so as to add a positive component to said fill rate;

when said controller determines said buffer fill rate is positive and said buffer data level is greater than or equal to an upper inner data-level threshold between said lower inner data-level threshold and said upper data-level threshold, said controller is configured to dispatch said rate-control signal to adjusts said source data rate so that a negative component is added to said fill rate.

18. A data-flow regulation apparatus as claimed in claim 14 wherein:

said data-source initially establishes said source data rate substantially equal to a predetermined data rate; and said data-sink initially establishes said sin data rate substantially equal to said predetermined data rate.

19. A data-flow regulation apparatus as claimed in claim 14 wherein:

said data source substantially continuously transmits said data;

said input function substantially continuously receives said data from said data source and substantially continuously writes said data to said buffer;

said output function substantially continuously reads said data from said buffer and substantially continuously receives said data; and one of said data source and said data sink repetitively adjusts one of said source data rate and said sink data rate, respectively, in response to said controller so as to substantially maintain said buffer data level between said lower and, upper data-level thresholds.

20. A data-flow regulation apparatus as claimed in claim 14 wherein one of said first and second memory portions shares a common address space with one of said data source and said data sink.

21. A method of regulating flow of data in a communication system, said method comprising:

establishing, in a data source, a source data rate substantially equal to a predetermined data rate greater than zero;

establishing, in a data sink, a sink data rate substantially equal to said predetermined data rate;

adjusting said source data rate in response to a rate-control signal, wherein, when said source data rate is less than said sink data rate and a level of said data within a buffer is less than or equal to a lower data-level threshold of said buffer, said adjusting activity adjusts said source data rate to be greater than said sink data rate, and wherein, when said source data rate is greater than said sink data rate and said buffer data level is greater than or equal to an upper data-level threshold of said buffer, said adjusting activity adjusts said source data rate to be less than said sink data rate;

transmitting said data at said source data rate by said data source;

writing said data into said buffer at said source data rate, wherein said writing activity increases said buffer data level;

reading said data from said buffer at said sink data rate, wherein said reading activity decreases said buffer data level;

receiving said data at said sink data rate by said data sink; monitoring said buffer data level; and dispatching, when said monitoring activity determines that said buffer data level is one of decreasing and increasing while at less than or equal to said lower data-level threshold and greater than or equal to said upper data-level thresholds, respectively, said rate-control signal to said data source.

* * * * *

UNITED STATES PATENT AND TRADEMARK OFFICE
CERTIFICATE OF CORRECTION

PATENT NO. : 6,715,007 B1
DATED : March 30, 2004
INVENTOR(S) : Brent Ashley Williams et al.

It is certified that error appears in the above-identified patent and that said Letters Patent is hereby corrected as shown below:

Column 11,
Line 21, after "said" (second occurrence) delete "said";
Line 47, delete "tan" and add -- than --;
Line 53, delete "said" (first occurrence) and after "of" add -- said --;

Column 13,
Line 4, delete "buff" and add -- buffer --;
Line 29, delete "dispatche" and add -- dispatch --;
Lines 40, 46 and 64, delete "adjusts" and add -- adjust --;
Line 56, delete "adjusts" and add -- adjust said --;

Column 14,
Line 63, delete "thresholds" and add -- threshold --.

Signed and Sealed this

Twenty-sixth Day of July, 2005

JON W. DUDAS
*Director of the United States Patent and Trademark Office*